United States Patent [19]
Birchler et al.

[11] Patent Number: 5,406,588
[45] Date of Patent: Apr. 11, 1995

[54] METHOD AND APPARATUS FOR MITIGATING DISTORTION EFFECTS IN THE DETERMINATION OF SIGNAL USABILITY

[75] Inventors: Mark A. Birchler, Roselle; Steven C. Jasper, Hoffman Estates; Timothy J. Wilson, Schaumburg, all of Ill.

[73] Assignee: Motorola, Inc., Schaumburg, Ill.

[21] Appl. No.: 69,947

[22] Filed: May 28, 1993

[51] Int. Cl.6 .......................... H03D 1/04; H04L 1/00
[52] U.S. Cl. .................................. 375/346; 375/347; 375/348; 375/350
[58] Field of Search ................ 375/99, 100, 101, 103

[56] References Cited

U.S. PATENT DOCUMENTS

| | | | |
|---|---|---|---|
| 4,584,696 | 4/1986 | Beeman et al. | 375/99 |
| 4,590,600 | 5/1986 | Beeman et al. | 375/99 |
| 4,972,434 | 11/1990 | LePolozec et al. | 375/100 |
| 5,058,139 | 10/1991 | Egler | 375/99 |
| 5,132,797 | 7/1992 | Citta | 375/101 |
| 5,162,900 | 11/1992 | Citta | 375/101 |
| 5,170,413 | 12/1992 | Hess et al. | 375/38 |

Primary Examiner—Edward L. Coles, Sr.
Assistant Examiner—Kimberly A. Williams
Attorney, Agent, or Firm—Timothy J. Markison

[57] ABSTRACT

A receiver may reduce the effects of distortion when determining signal usability in the following manner. Upon receiving a signal, the receiver separates a desired component, an undesired component, and a distortion component, wherein the desired component includes the signal that was originally transmitted and the undesired component includes interference and noise. Having isolated the distortion component, it can be mitigated such that the usability of the signal received can be determined based on a ratio between the desired and undesired components.

6 Claims, 4 Drawing Sheets

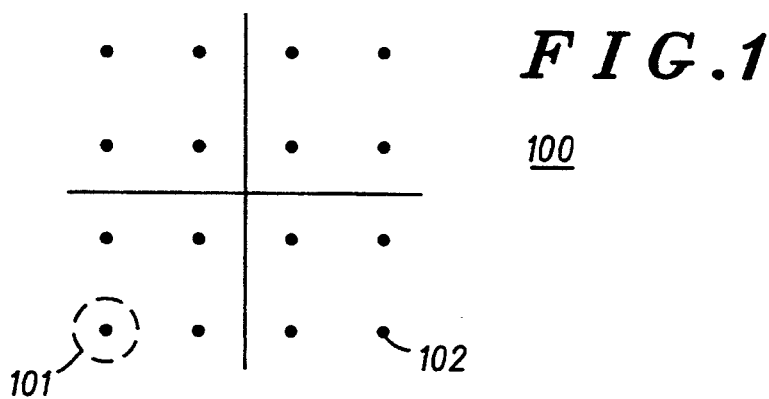
FIG.1
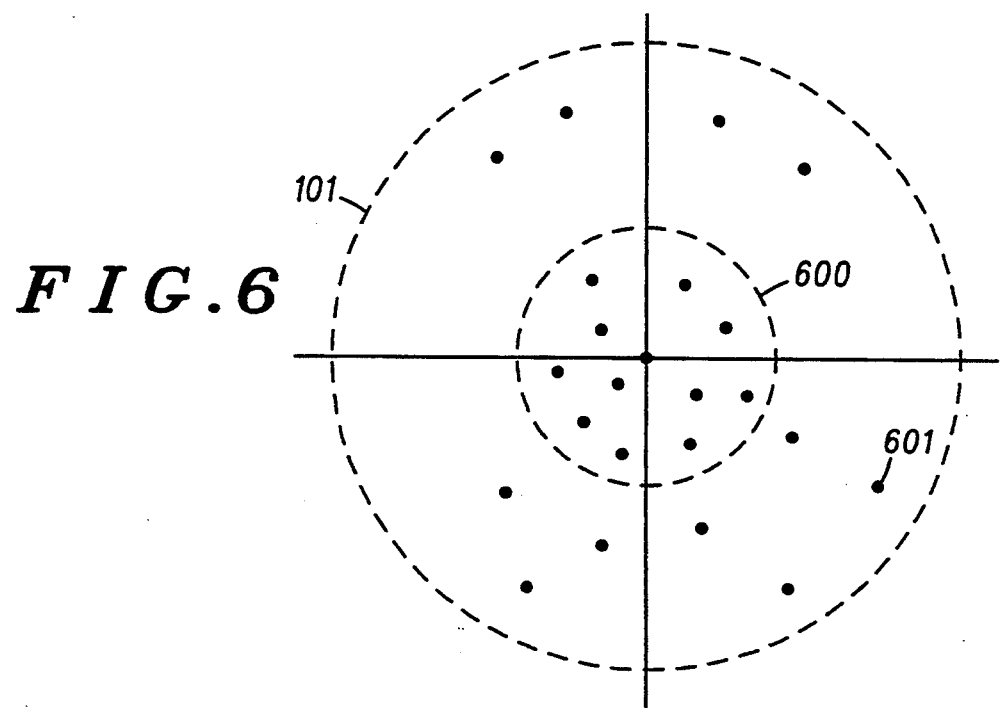
FIG.6
FIG.7
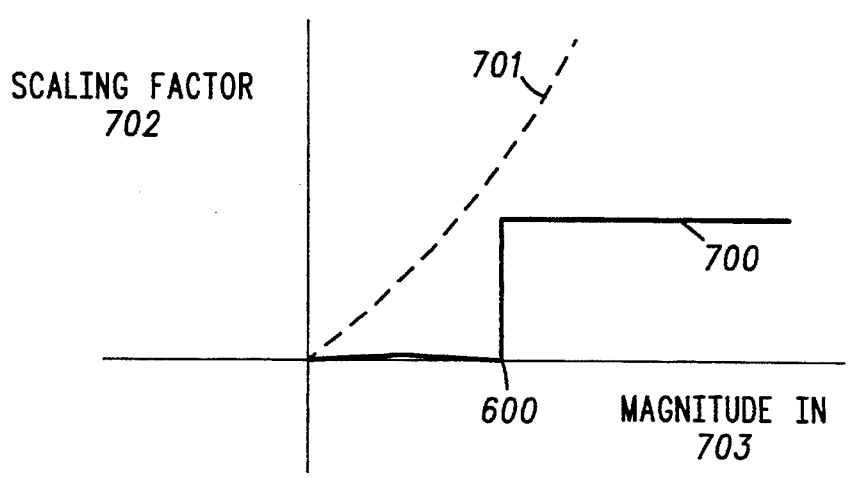

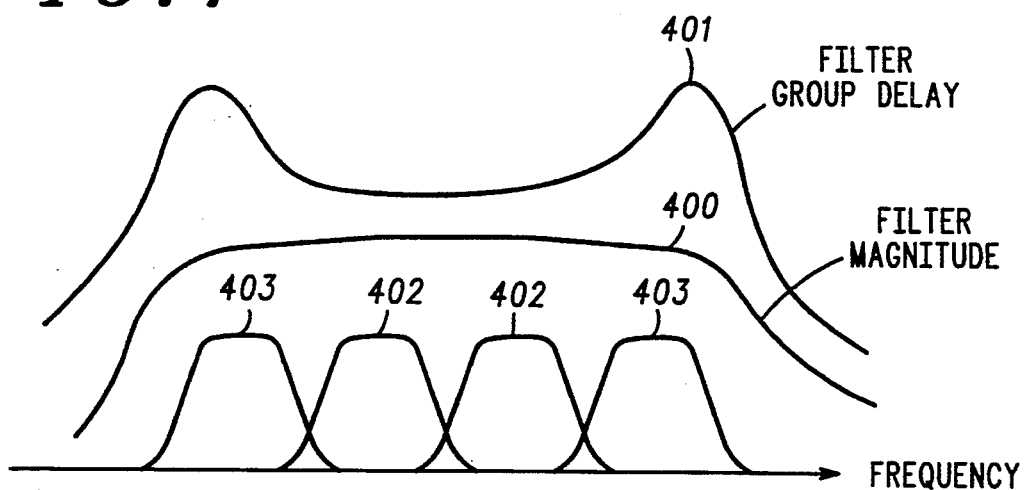
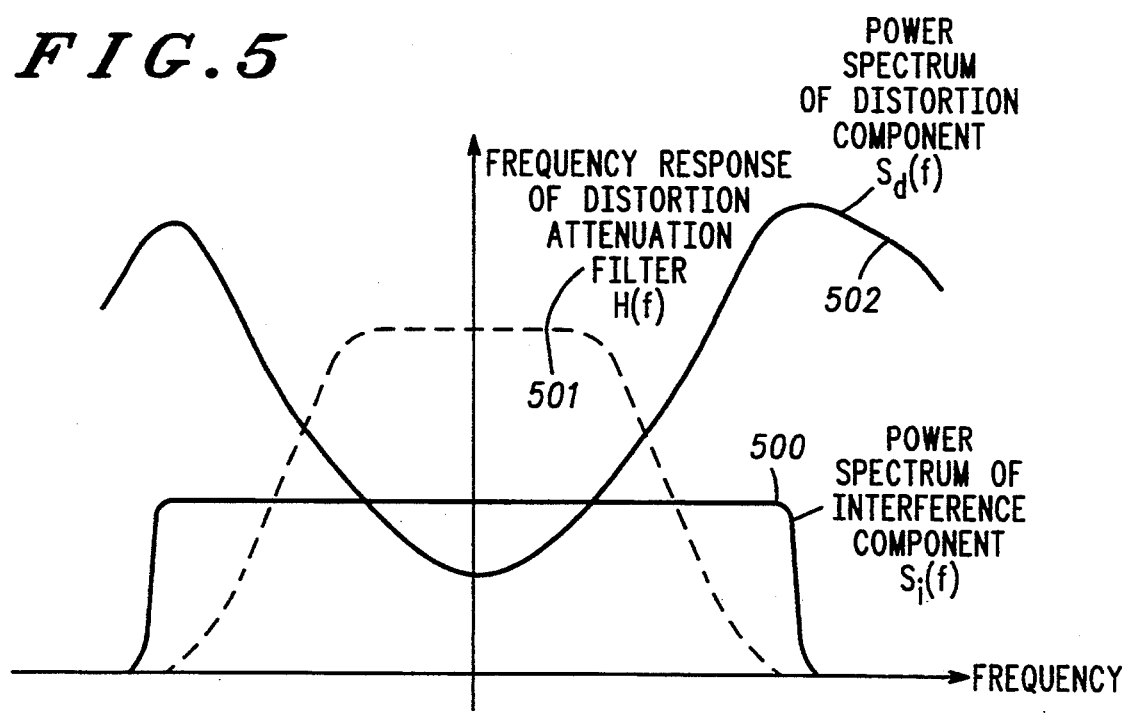

METHOD AND APPARATUS FOR MITIGATING DISTORTION EFFECTS IN THE DETERMINATION OF SIGNAL USABILITY

FIELD OF THE INVENTION

This invention relates generally to communication systems and, in particular, to a communication system with geographic reuse of communication resources.

BACKGROUND OF THE INVENTION

Communication systems that geographically reuse communication resources are known in the art. These systems allocate a predetermined set of communication resources in one geographic area and reuse the same set of communication resources in one or more geographic areas. This reuse technique improves communication capacity by minimizing the number of communication resources necessary to provide communication service in a large geographic area comprised of several smaller geographic areas.

Two of the most common communication systems which geographically reuse communication resources are cellular and trunked mobile communication systems. In both communication systems, allocation of a communication resource begins when a communication unit requests communication service. Based on resource availability and signal usability, a resource controller assigns the communication resource, such as a frequency channel or a time slot, to the communication unit. A communication, such as a conversation or a facsimile transmission, occurs on the communication resource between the communication unit and another communication unit or between the communication unit and a subscriber to a public service telephone network. The communication continues until completion or an interruption in service occurs. Upon conclusion of the communication, the resource controller retrieves the communication resource; thus making the communication resource available for another communication.

An important parameter in identifying an acceptable communication resource is signal usability. In a wireless communication system, communication resources are typically radio frequency (RF) channels which occupy predetermined bandwidths. When information signals are transmitted on the RF channels (communication resources), undesired channel effects, such as interference, noise, and distortion of the transmitter and receiver, alter the information signals during transmission and reception. Therefore, the information signals received by a receiver in a communication unit, or a base station, are corrupted by the interfering channel and distortion effects. By ascertaining an indication of the interference and noise on available communication resources, the most reliable communication resource may be selected for the communication. This indication is known as signal usability.

In geographic reuse communication systems, signal usability is typically limited by the quantity of co-channel interference present on the RF channel. Co-channel interference occurs when receivers receive unwanted information signals from neighboring communication units, or base stations, transmitting on the same channel as the desired RF channel. For a detailed discussion of a method for determining signal usability based on a ratio of the desired signal (C) to the summed quantity of co-channel interference (I) and noise (N) refer to a co-pending United States Patent application, entitled "A Method And Apparatus For Determining Signal Usability", assigned to Motorola Inc. having the same filing date as this application and referenced by applicant's docket number CM01662H. While this technology provides many advantages, it does not address the technological concern of dynamic range limitations imposed by transmitter and receiver distortion effects on determined signal usability.

Distortion effects have several causes with one common result, they tend to limit the maximum achievable signal usability indication ($C/(I+N)$). Distortion effects add to the interference term in the denominator of the carrier to interference plus noise ratio to produce a new indication of signal usability, $C/(I+N+D)$, where D represents the distortion effects produced by both the receiver and the transmitter. Typically, the co-channel interference is much larger than the distortion effects; thus, the distortion effects can be neglected and the indication of signal usability can be obtained by evaluating the carrier to interference plus noise ratio. When the co-channel interference becomes small, the distortion effects impact the signal usability indication and prevent a linear correlation between the actual signal usability and the carrier to interference plus noise ratio. Therefore, without acknowledging the effects of distortion, the range of accurate signal usability indications determined from evaluating the carrier to interference plus noise ratio is limited to a maximum value due to the implications of the distortion effects. In a logarithmic representation, the maximum measurable carrier to interference plus noise ratio is typically less than 25 dB due to inherent distortions of present technology. However, some frequency reuse communication systems require maximum signal usability indications in excess of 30 dB for optimal system operation. In these wide dynamic range systems, estimating distortion effects is critical to obtaining accurate indications of signal usability and enhancing system functionality.

Distortion effects commonly encountered in transmitters and receivers include timing errors in digital receivers, carrier feedthrough, filter distortions, and amplifier nonlinearities. Timing errors result from improper sampling of a received signal and promote intersymbol interference. Carrier feedthrough degrades the desired signal by displacing a portion of the RF carrier energy into the modulated information signal. Filter distortions modify the magnitude and phase of the desired signal due to their inherently variant magnitude and group delay frequency responses. Amplifier nonlinearities, such as intermodulation distortion, introduce unwanted RF energy into the bandwidth of the desired signal.

Therefore, a need exists for a method and apparatus that mitigate the effects of distortion to enhance the dynamic range of signal usability determinations.

BRIEF DESCRIPTION OF THE DRAWINGS

FIG. 1 illustrates a constellation depiction of received information symbols in accordance with the present invention.

FIG. 4 illustrates frequency responses of a filter and received signal subchannels that include streams of information symbols in accordance with the present invention.

FIG. 5 illustrates frequency responses of a distortion component, an interference component, and a distortion attenuation filter in accordance with the present invention.

FIG. 6 illustrates an exploded constellation depiction of received information symbols' selected filtered undesired components in accordance with the present invention.

FIG. 7 illustrates a graphical view of scaling functions in accordance with the present invention.

DESCRIPTION OF A PREFERRED EMBODIMENT

Generally, the present invention provides a method and apparatus for mitigating distortion effects and enhancing signal usability determinations in a receiver. This is accomplished by receiving a discrete information signal that includes a stream of information symbols and processing the received signal to obtain estimates of the information symbols. Each symbol estimate is composed of three components: a desired component, an interference component, and a distortion component. By initially determining a representation of the desired component and characteristics of the distortion component, an undesired component can be determined. A representation of the interference component can be subsequently determined based on the undesired component and the distortion characteristics. An enhanced determination of signal usability for each symbol estimate is determined based on the representations of the desired and interference components. The enhancement of the signal usability determination is achieved by minimizing effects of the distortion component in the interference component determination. Thus, the enhanced signal usability determination approaches being a function of only the desired and interference components, substantially exclusive of the distortion component.

The present invention can be more fully described with reference to FIGS. 1–7. FIG. 1 illustrates a constellation depiction of a 16-ary quadrature amplitude modulation (QAM) information symbol pattern 100. Each information symbol 102 of this constellation is two-dimensional and has a value defined by its coordinates with respect to an orthogonal pair of axes.

As is known in the art, a signal that includes a stream of discrete information symbols can be transmitted over a communication resource, such as an RF transmission channel, and received by a receiver. Due to the presence of distortions in the transmitter and receiver and interference, noise, and additional distortion in the transmission channel, the received value of each information symbol 102 is typically altered. Excluding the additional distortion in the transmission channel, this alteration will consist of an approximately zero mean random process superimposed on each information symbol 102 of the transmitted stream. Thus, the received values for each information symbol 102 appear within a range 101 of values centered about the value of the corresponding transmitted information symbol.

Figure 2:
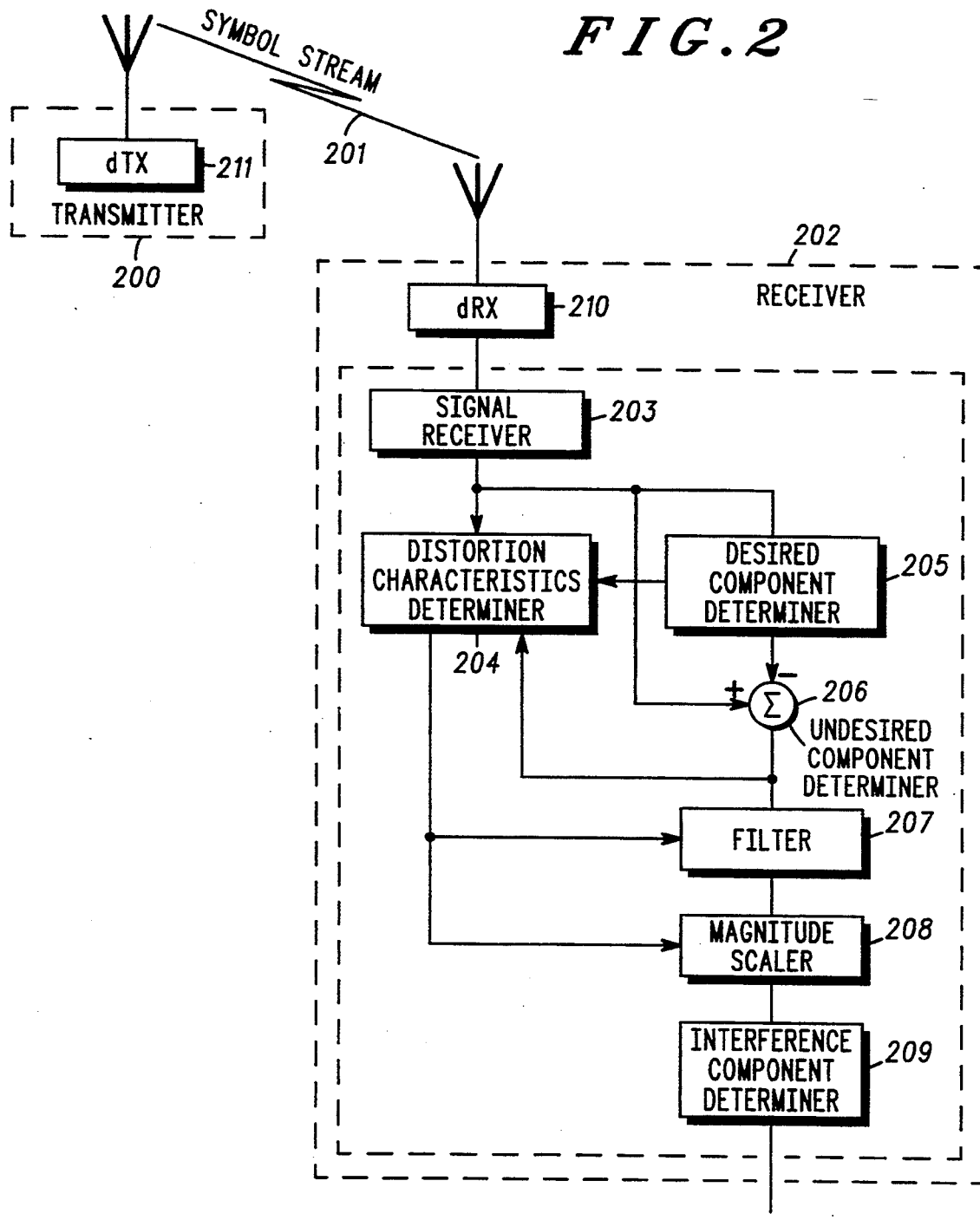
FIG. 2 illustrates a block diagram depiction of a communication system that includes a receiver in accordance with the present invention.

FIG. 2 illustrates a transmitter 200 transmitting a symbol stream 201 over a communication resource to a receiver 202. The symbol stream 201 is altered throughout its path from the transmitter 200 to the receiver 202 by inherent transmitter distortion 211, noise and interference in the RF channel, and inherent receiver distortion 210. Thus, the resultant altered symbol stream at the input to the receiver's signal receiver 203 includes a desired component, an interference component, and a distortion component such that the desired component includes the original unaltered symbol stream, the interference component incorporates the noise and interference from the RF channel, and the distortion component includes the distortions 210 and 211 from the transmitter 200 and the receiver 202, respectively.

The receiver 202, which includes the signal receiver 203, a distortion characteristics determiner 204, a desired component determiner 205, an undesired component determiner 206, a filter 207, a magnitude scaler 208, and an interference component determiner 209, is used to process the altered symbol stream and provide a determination of symbol stream usability. The signal receiver 203 receives, amplifies, filters, and converts the altered symbol stream to a baseband symbol stream that can be processed by the desired and undesired component determiners 205 and 206 and the distortion characteristics determiner 204. The signal receiver 203 typically includes a RF front-end, filters, frequency downconverters, analog to digital converters, and digital signal processing required to reliably obtain estimates of the received symbol stream. The baseband symbol stream includes baseband representations of the desired, interference, and distortion components. The distortion characteristics determiner 204 accepts the baseband symbol stream and determines distortion characteristics of its distortion component typically based on preestablished information regarding the inherent receiver and transmitter distortions 210 and 211. The desired component determiner 205 also admits the baseband symbol stream and determines a representation of its desired component. A detailed discussion of a method for determining the desired component's representation is provided in co-pending U.S. patent application Ser. No. 07/783,289, entitled "Communication Signal Having A Time Domain Pilot Component", assigned to Motorola Inc. and co-pending U.S. patent application, entitled "A Method And Apparatus For Determining Signal Usability", assigned to Motorola Inc. having the same filing date as this application and referenced by applicant's docket number CM01662H.

The undesired component determiner 206 receives the baseband symbol stream and the output of the desired component determiner 205 and determines the baseband symbol stream's undesired component typically by subtracting the desired component's representation from the baseband symbol stream. The undesired component, which includes the interference and noise from the RF channel and the receiver and transmitter distortions 210 and 211, is supplied to the filter 207. The filter 207 attenuates the distortion component's frequency response by attenuating the frequency components that reside outside the passband of the filter 207. The frequency response of the filter 207 is based on the distortion characteristics obtained in the distortion characteristics determiner 204.

The magnitude scaler 208 accepts the filtered undesired component from the filter 207 and scales it by a predetermined value dependent on the value of its magnitude compared to a set of reference magnitude values. The set of reference magnitude values may be preset within or dynamically determined by the magnitude scaler 208 based on the distortion characteristics obtained in the distortion characteristics determiner 204.

For example, the magnitude scaler 208 may scale the filtered undesired component by one value when the magnitude of the filtered undesired component is less than a selected reference value and scale it by another value when its magnitude is greater than the selected reference value. Further, the magnitude scaler 208 may functionally scale the filtered undesired component, as opposed to scaling with discrete values. The magnitude scaler 208 typically comprises a processor that contains a software algorithm which performs the scaling of the filtered undesired component. The output of the magnitude scaler 208 enters the interference component determiner 209 where the interference component of the baseband symbol stream is extracted from the scaled filtered undesired component. The interference component primarily comprises the interference and noise from the RF channel, with a negligible distortion component. The output of the interference component determiner 209 is processed in conjunction with the desired component to determine an indicia of the symbol stream usability. A technique for determining the indicia of symbol stream usability is discussed in the aforementioned co-pending U.S. patent application, entitled "A Method And Apparatus For Determining Signal Usability", assigned to Motorola Inc. having the same filing date as this application and referenced by applicant's docket number CM01662H; thus, no further discussion will be presented except to facilitate the understanding of the present invention. Determination of the indicia of symbol stream usability is critical from a communication system viewpoint since it provides an estimate to the condition of a communication on the RF channel.

The distortion characteristics determiner 204 may operate either as an on-line adaptive system that continuously operates on the baseband symbol stream or as an off-line system that contains preestablished distortion characteristics in its memory. In either case, the characteristics utilized to attenuate the distortion component include its frequency spectrum, magnitude as a function of transmitted symbol type, such as constellation location or subcarrier frequency, and magnitude as a function of predetermined transmitter and receiver distortions 211 and 210. In this embodiment, the distortion characteristics determiner 204 is of the off-line type. Known computer simulation programs model the distortions 211 and 210 in the transmitter 200 and receiver 202. Program model simulations, each aimed at isolating and measuring one of the distortion characteristics, provide the distortion characteristics stored in a memory portion of the distortion characteristics determiner 204.

Since the frequency power spectrums of the distortion and interference components differ in spectral content, the frequency response of the filter 207 may be selected to substantially influence the power spectrum of the distortion component. The power spectrum of the distortion component is not generally flat, that is, it does not have a uniform power spectral density (PSD) over the frequency band of interest. The PSD of the distortion component is greater in some frequency regions than others within the frequency band of interest. Contrastly, the interference component power spectrum is typically flat. Therefore, attenuation of the distortion component's power with respect to the interference component's power may be accomplished by use of the filter 207. The filter 207 is designed to attenuate the frequency components of the undesired component that are in the region of high distortion PSD, while leaving the frequency regions of lower distortion PSD relatively unaffected. This filtering technique reduces the power of the distortion component more than that of the interference component. Thus, the filter 207 achieves the desired goal of attenuating the distortion component with respect to the interference component. Since the power of the distortion component is generally greater near the edges of the frequency band of interest, the frequency response typically chosen for the filter 207 is lowpass in topology.

Since the distortion and interference components may not be completely separated by filtering techniques, a scaling process is used to further aid in minimizing the content of the distortion component. Complete separation of the distortion and interference components is prevented due to the overlap in frequency of their PSD's; thus, there remains a non-zero distortion component of the undesired component after filtering. Therefore, even without any interference and noise in the RF channel, the output of the filter 207 still includes the non-zero distortion component. To account for this discrepancy, the magnitude scaler 208 scales any filter output component whose magnitude is less than some predetermined value by a lower amount than any component whose magnitude is greater than the predetermined value. This scaling procedure gives lower weight to those components that can be reasonably attributed to distortion than those which can be attributed to interference, thus attenuating the overall distortion component with respect to the overall interference component.

Figure 3:
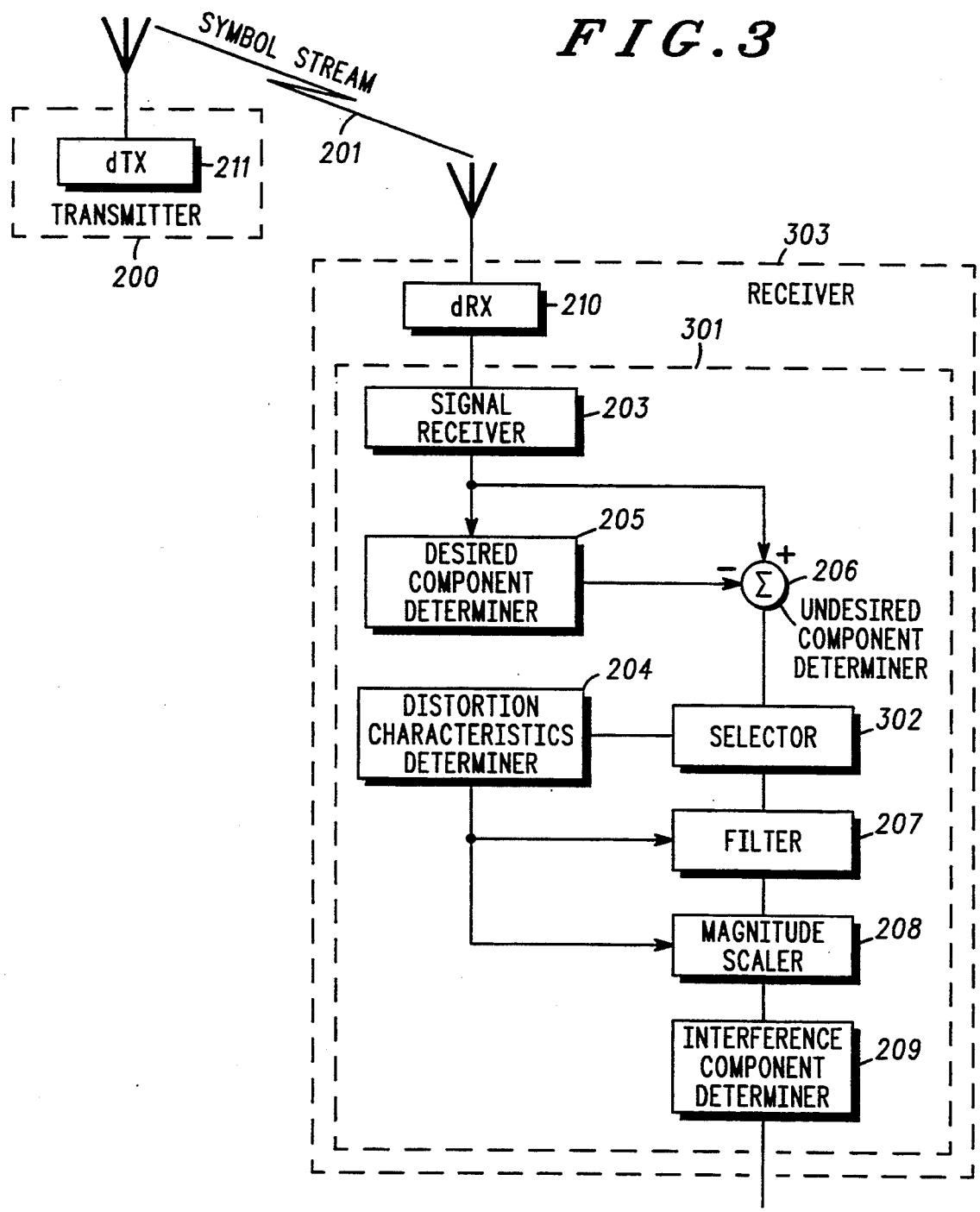
FIG. 3 illustrates an alternative block diagram depiction of a communication system that includes a receiver in accordance with the present invention.

FIG. 3 illustrates the transmitter 200 transmitting the symbol stream 201 over the RF channel to an alternate receiver 303. The receiver 303 includes an apparatus 301 that comprises the signal receiver 203, the distortion characteristics determiner 204, the desired component determiner 205, the undesired component determiner 206, the filter 207, the magnitude scaler 208, the interference component determiner 209, and a selector 302. As previously discussed with reference to FIG. 2, the symbol stream 201 is altered throughout is path from the transmitter 200 to the receiver 303 by the interference and noise in the RF channel and the inherent transmitter and receiver distortions 211 and 210.

The flow of the altered symbol stream within the receiver's apparatus 301 is similar to the flow discussed with reference to the receiver 202 of FIG. 2, therefore additional detail will only be presented with regard to the new elements. The signal receiver 203 receives, amplifies, filters, and converts the altered symbol stream to a baseband symbol stream that can be processed by the desired and undesired component determiners 205 and 206. The distortion characteristics determiner 204 determines distortion characteristics of the baseband symbol stream's distortion component based on preestablished information regarding the distortions 210 and 211 in the receiver 202 and the transmitter 200. The desired component determiner 205 accepts the baseband symbol stream and determines a representation of its desired component. The undesired component determiner 206 receives the baseband symbol stream and the output of the desired component determiner 205 and determines the baseband symbol stream's undesired component by subtracting the desired component's representation from the baseband symbol stream. The undesired component, which includes the interference and distortion components, is supplied to the selector 302, which is typically a processor that contains a software algorithm that selects a portion of the undesired component to use for further processing based on the distortion characteristics obtained by the distortion characteristics determiner 204. Additionally, the function of the selector 302 may be expanded to select a portion of the desired component that corresponds to the selected portion of the undesired component although the interconnection of the desired component determiner 205 to the selector 302 is not shown. The output of the selector 302 enters the filter 207 where the distortion component of the selected portion of the undesired component is attenuated with respect to the interference component. When the selector 302 also selects the portion of the desired component, the filter 207 correspondingly attenuates any part of the desired component's selected portion that resides in its stopband. By selecting and filtering the portions of both the desired and undesired components, timing of the two portions with respect to each other is maintained; thus enhancing the accuracy of the subsequent indicia of symbol stream usability determination. The magnitude scaler 208 accepts the filtered selected portion of the undesired component and scales it by a predetermined value-dependent on the value of its magnitude compared to the set of reference magnitude values. The output of the magnitude scaler 208 enters the interference component determiner 209 where the interference component of the baseband symbol stream is extracted from the scaled filtered selected portion of the undesired component. The interference component primarily comprises the interference and noise from the RF channel, with a negligible distortion component. The output of the interference component determiner 209 is processed in conjunction with the desired component, or the selected filtered portion of the desired component, to determine the indicia of the symbol stream usability.

Due to the various distortions 210 and 211 in the transmitter 200 and receiver 303, each symbol of the symbol stream 201 may encounter different levels of distortion. For example, in a multiple subchannel system, as discussed in co-pending U.S. patent application Ser. No. 07/783,289, entitled "Communication Signal Having A Time Domain Pilot Component", assigned to Motorola Inc., information symbols conveyed on one of four subchannels may be corrupted with less distortion than are those conveyed by the other three subchannels. Additionally, the distortions 210 and 211 may corrupt some information symbol values more than others dependent on their coordinates in an information symbol constellation pattern. Therefore, to enhance the distortion minimization processes of the filter 207 and the magnitude scaler 208, only those information symbols least susceptible to corruption are selected by the selector 302 to be utilized in the interference component determination process. The degree of corruption susceptibility is based on the distortion characteristics determined in the distortion characteristics determiner 204.

FIG. 4 illustrates the frequency response of an information signal's inner subchannels 402 and outer subchannels 403 in relation to a filter's magnitude 400 and group delay 401. This subchannel configuration is typical of the multiple subchannel system previously discussed with reference to co-pending U.S. patent application Ser. No. 07/783,289, entitled "Communication Signal Having A Time Domain Pilot Component", assigned to Motorola Inc. The filter's magnitude 400 and group delay 401 may represent those obtained with a bandpass crystal filter used in a receiver front-end.

As depicted in FIG. 4, the magnitude and group delay distortion suffered by the outer subchannels 403 as the information signal passes through the filter is greater than that suffered by the inner subchannels 402. The greater amount of filter distortion on the outer subchannels 403 causes greater distortion components in their respective information symbols compared to the distortion components of the information symbols on the inner subchannels 402. Therefore, in this situation, further processing of the information symbols on the inner subchannels 402 is preferred due to their minimal distortion. Alternatively, due to effects of other distortion processes, the inner subchannels 402 may be more distorted than the outer subchannels 403. In this alternative scenario, further processing of the information symbols on the outer subchannels 403 is preferred. In any case, the information symbols with the least amount of distortion should be selected for further processing.

FIG. 5 illustrates the frequency response of a distortion attenuation filter 501 in relation to PSD's of an undesired component's interference component 500 and distortion component 502. As previously discussed with reference to FIG. 2, the PSD of the distortion component 502 is not uniform within the frequency band of interest. Contrastly, the PSD of the interference component 500 is uniform over the same frequency band. Therefore, a significant reduction in the distortion component's PSD 502 by the frequency response of the filter 501 is obtainable over most of the frequency band without any detrimental effect to the PSD of the interference component 500. This result allows the frequency response of the undesired component to more closely resemble the PSD of the interference component 500 after filtering. Thus, this filtering technique enables a more accurate determination of signal usability since the signal usability is directly dependant on the undesired component's interference component.

FIG. 6 illustrates an exploded graphical view of the range 101 of received information symbols' selected filtered undesired components 601 typically present at the output of the undesired component determiner 206. The plurality of selected filtered undesired components 601 are randomly displaced around the origin of the graph, due to effects of interference and distortion superimposed onto a desired information symbol. Without the presence of interference in the RF channel, the randomly displaced selected filtered undesired components 601 occur due to distortion and have a large proportion of their values within a radius of the origin that corresponds to the predetermined magnitude value 600. By assigning a lower weight, or scaling value, to those selected filtered undesired component values within the specified radius, the content of distortion in the undesired component is further reduced.

Determination of the scaling value is primarily a function of the predetermined magnitude value 600 or other predetermined magnitude values. As depicted in FIG. 6, the selected filtered undesired components 601 lying within the radius corresponding to the predetermined magnitude value 600 are assigned one scaling value and those symbols lying outside the radius are assigned a larger scaling value to distinguish the more distorted symbols from the less distorted symbols. Alternatively, several radii, each with an associated magnitude value, may be arranged concentric to the origin.

Thus, the selected filtered undesired components 601 lying between each radius are assigned a unique predetermined scaling value dependant on which radii the selected filtered undesired components 601 are between. Further, this multiple radii concept may be extended to provide a scaling function that scales all the selected filtered undesired components 601 based on the function's value at a specified radius.

FIG. 7 illustrates two possible predetermined scaling functions 700 and 701 with respect to the magnitude of the selected filtered undesired component 703. The first function 700 eliminates any selected filtered undesired component whose magnitude is less than the predetermined magnitude value 600 by multiplying the component by zero. Selected filtered undesired components of magnitude greater than the predetermined magnitude value 600 are multiplied by a specified non-zero value. The second function 701 differs from the first function 700 in that it is continuous with respect to the magnitude of the selected filtered undesired component 703. The second function 701 provides less scaling to those components whose magnitude is less than the predetermined magnitude value 600 and greater scaling to those components whose magnitude is greater than the predetermined magnitude value 600. Any function may be utilized to provide the scaling of the selected filtered undesired components, but typical functions include second or third order polynomials and lines. The choice of scaling function depends on the amount of distortion reduction necessary to obtain a reliable signal usability determination.

The present invention provides a method and apparatus for mitigating distortion effects and enhancing signal usability determinations in a receiver. With the present invention, the dynamic range limitation on signal usability determinations, due to the presence of distortion in an undesired component of a received symbol stream, is significantly improved such that maximum signal usability indications in excess of 30 dB, as opposed to the prior art limit of 25 dB, are achievable. Previous attempts to measure signal usability by directly measuring the carrier (C) to interference (I) power ratio have been limited due to the presence of a significant distortion component in the interference measurement. While the intent was to determine the carrier to interference ratio, C/I, the actual measurement provided a ratio of the carrier to the interference plus distortion, C/(I+D), where D represents the power in the distortion component. Therefore, when the interference power is substantially reduced, the measurement will approach a constant value determined by the ratio of the carrier to the distortion, C/D. This effect limits the dynamic range of the measured carrier to interference ratio, C/(I+D), by restricting its maximum value to the carrier to distortion ratio, C/D. The present invention increases the dynamic range of the signal usability indication by significantly reducing the power of the distortion term with respect to the power of the interference term; thus enabling a greater maximum value of the measured carrier to interference ratio to be attained.

We claim:

1. In a receiver that receives a stream of information symbols, a method for mitigating distortion effects to enhance signal usability determination, the method comprises the steps of:
 a) receiving a stream of information symbols to produce a symbol stream, wherein each information symbol of the symbol stream includes a desired component, an interference component, and a distortion component;
 b) determining characteristics of the distortion component to produce distortion characteristics;
 c) determining a representation of the desired component to produce a desired representation;
 d) determining an undesired component based on the desired representation and the symbol stream;
 e) determining a representation of the interference component based on the undesired component and the distortion characteristics; and
 f) determining an indicia of symbol stream usability based on the desired representation and the representation of the interference component, wherein step (e) further comprises:
 e1) determining at least one magnitude value based on the distortion characteristics;
 e2) when magnitude of the undesired component is less than the at least one magnitude value, scaling the undesired component by a first predetermined value; and
 e3) when the magnitude of the undesired component is greater than the at least one magnitude value, scaling the undesired component by a second predetermined value, wherein the second predetermined value is greater than the first predetermined value.

2. In a receiver that receives a stream of information symbols, wherein each information symbol of the stream of information symbols includes a desired information symbol component, an interference component, and a distortion component, a method for substantially eliminating the distortion component, the method comprises the steps of:
 a) receiving the stream of information symbols to produce a symbol stream;
 b) determining, by the receiver, representations for each of the desired information symbol components to produce symbol representations;
 c) determining, by the receiver, distortion characteristics based on preestablished distortion information of the receiver and a transmitter that transmitted the symbol stream;
 d) determining, by the receiver, undesired components based on the symbol representations and the symbol stream;
 e) determining, by the receiver, selected undesired components of the undesired components based on the distortion characteristics;
 f) filtering, by the receiver, the distortion components from the selected undesired components via a filter to produce filtered selected undesired components; and
 g) determining, by the receiver, a representation of the interference components based on the filtered selected undesired components and the desired components such that the representation of the interference components and the desired components form a basis for determining an indicia of usability of the symbol stream.

3. In the method of claim 2, the determination of the representation of the interference components of step (g) further comprises:
 g1) determining at least one magnitude value based on the distortion characteristics;
 g2) when magnitude of a filtered selected undesired component of the filtered selected undesired components is less than the at least one magnitude value, scaling the filtered selected undesired component by a first predetermined value; and g3) when the magnitude of a filtered selected undesired component of the filtered selected undesired components is greater than the at least one magnitude value, scaling the filtered selected undesired component by a second predetermined value, wherein the second predetermined value is greater than the first predetermined value.

4. In the method of claim 2, the determination of the undesired components of step (d) comprises subtracting the symbol representations from the symbol stream.

5. An apparatus for mitigating distortion effects and enhancing signal usability determinations in a receiver, the apparatus comprises:

a signal receiver that receives a stream of information symbols to produce a symbol stream;

a distortion characteristics determiner, wherein the distortion characteristics determiner determines distortion characteristics for a distortion component of each information symbol of the symbol stream;

a desired component determiner, operably coupled to the signal receiver, wherein the desired component determiner determines a desired component for each information symbol of the symbol stream;

an undesired component determiner, operably coupled to the desired component determiner and the signal receiver, wherein the undesired component determiner determines an undesired component for each information symbol of the symbol stream based on the desired component and the symbol stream; and interference component determiner, operably coupled to the undesired component determiner and the distortion characteristics determiner, wherein the interference component determiner determines an interference component for each information symbol of the symbol stream based on the desired component, the distortion characteristics, and the undesired component;

wherein the apparatus further comprises a magnitude scaler that is operably coupled to the interference component determiner, the distortion characteristics determiner, and the undesired component determiner, wherein the magnitude scaler scales magnitude of the undesired component by a first predetermined value when the magnitude of the undesired component is less than at least one magnitude value and scales the magnitude of the undesired component by a second predetermined value when the magnitude of the undesired component is greater than the at least one magnitude value.

6. An apparatus for mitigating distortion effects and enhancing signal usability determinations in a receiver, the apparatus comprises:

a signal receiver that receives a stream of information symbols to produce a symbol stream;

a distortion characteristics determiner, wherein the distortion characteristics determiner determines distortion characteristics for a distortion component of each information symbol of the symbol stream;

a desired component determiner, operably coupled to the signal receiver, wherein the desired component determiner determines a desired component for each information symbol of the symbol stream;

an undesired component determiner, operably coupled to the desired component determiner and the signal receiver, wherein the undesired component determiner determines an undesired component for each information symbol of the symbol stream based on the desired component and the symbol stream;

a selector, operably coupled to the undesired component determiner and the distortion characteristics determiner, wherein the selector selects selected undesired components of the undesired components based on the distortion component;

interference component determiner, operably coupled to the selector and the distortion characteristics determiner, wherein the interference component determiner determines an interference component for each information symbol of the symbol stream based on the desired component, the distortion characteristics, and the selected undesired component, wherein the apparatus further comprises a magnitude scaler that is operably coupled to the interference component determiner and the selector, wherein the magnitude scaler scales magnitude of the selected undesired components by a first predetermined value when the magnitude of the interference component is less than at least one magnitude value and scales the magnitude of the selected undesired components by a second predetermined value when the magnitude of the interference component is greater than the at least one magnitude value.

* * * * *